(No Model.) 7 Sheets—Sheet 1.
N. GRAY & E. G. CUSHING.
Machine for Sizing, Stretching, and Drying Cloth.
No. 234,771. Patented Nov. 23, 1880.

WITNESSES: INVENTORS:
E. Laass Niel Gray & Elbridge G. Cushing
C. Bendixen per Duell, Laass & Hey
Attorneys.

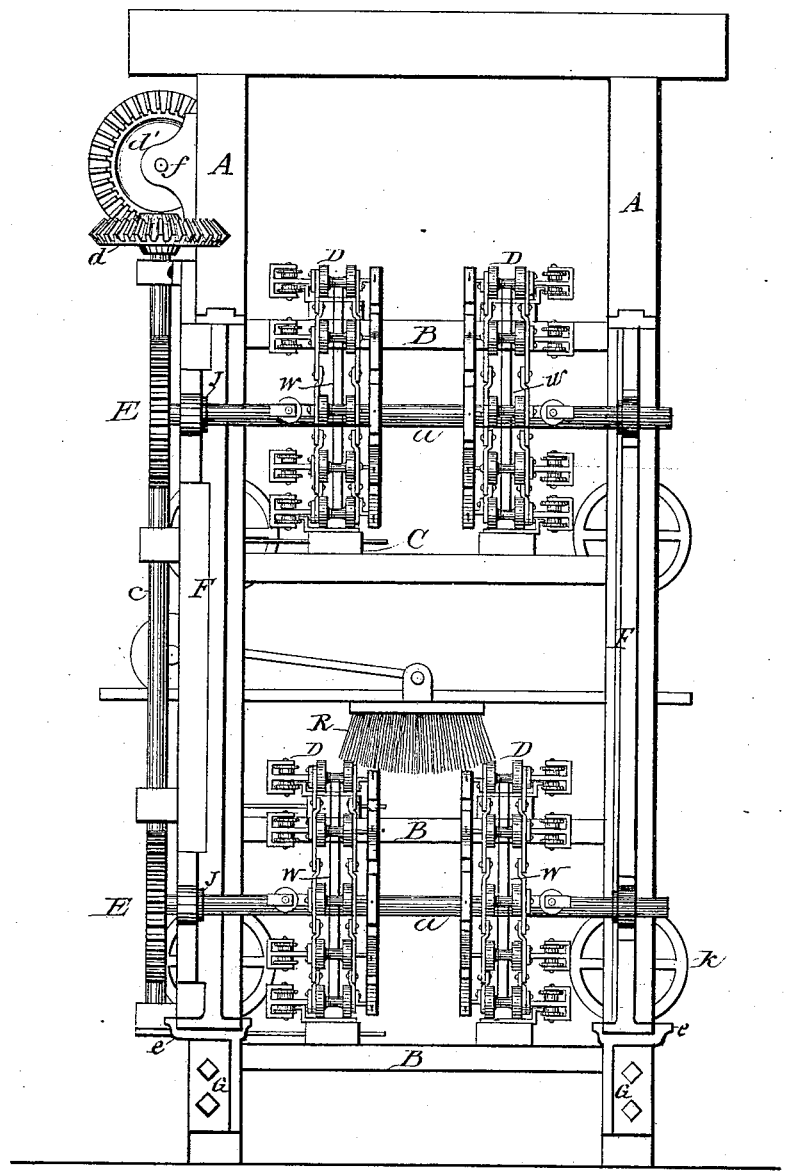

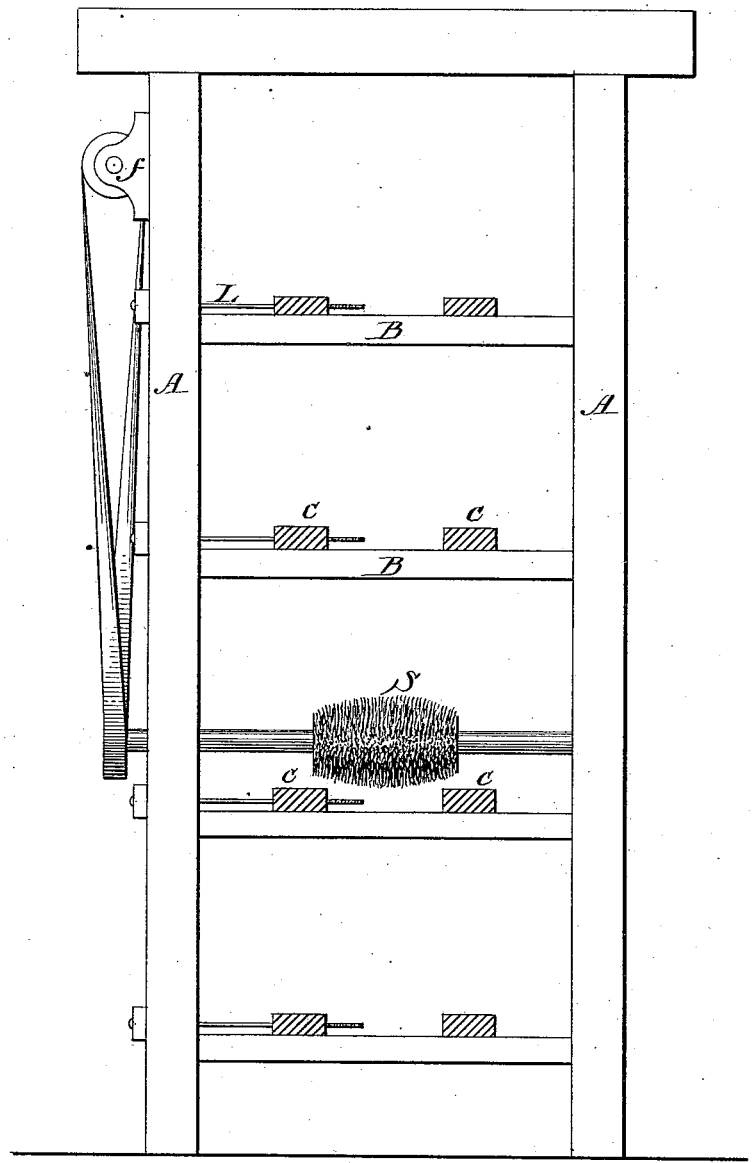

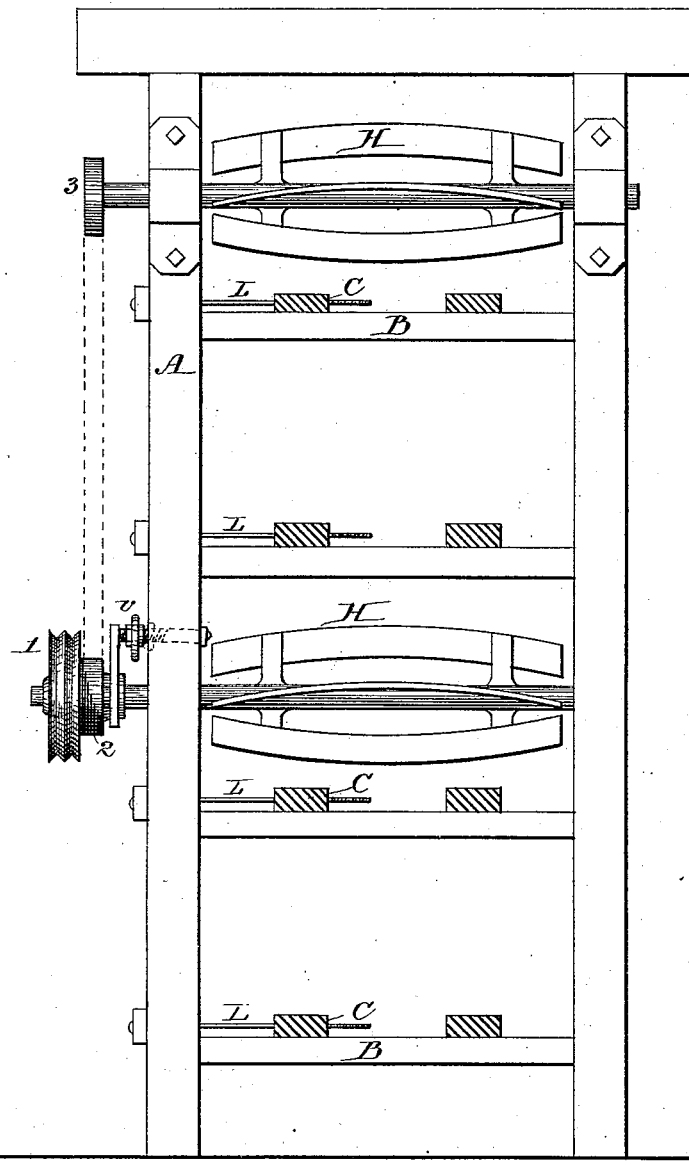

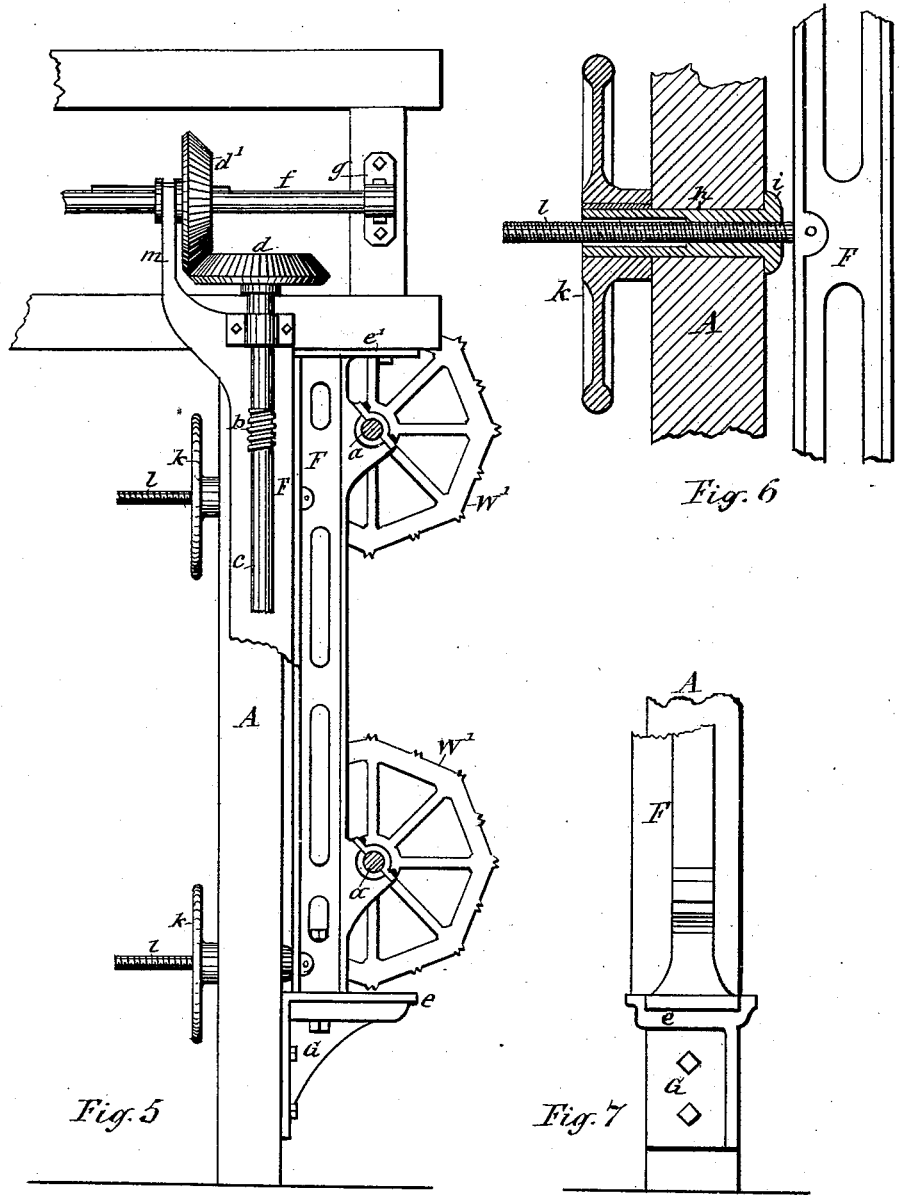

(No Model.)  7 Sheets—Sheet 6.

N. GRAY & E. G. CUSHING.

Machine for Sizing, Stretching, and Drying Cloth.

No. 234,771.  Patented Nov. 23, 1880.

WITNESSES:
E. Laass
C. Bendixen.

INVENTORS:
Niel Gray & Elbridge G. Cushing
per Drull, Laass & Hey
Attorneys (No Model.)  7 Sheets—Sheet 7.

N. GRAY & E. G. CUSHING.
Machine for Sizing, Stretching, and Drying Cloth.

No. 234,771.  Patented Nov. 23, 1880.

WITNESSES:
E. Laass
C. Bendixen

INVENTORS:
Niel Gray & Elbridge G. Cushing
per Duell, Laass & Hey
Attorneys

UNITED STATES PATENT OFFICE.

NIEL GRAY AND ELBRIDGE G. CUSHING, OF OSWEGO, NEW YORK; SAID CUSHING ASSIGNOR TO SAID GRAY.

MACHINE FOR SIZING, STRETCHING, AND DRYING CLOTH.

SPECIFICATION forming part of Letters Patent No. 234,771, dated November 23, 1880.

Application filed March 11, 1880. (No model.)

*To all whom it may concern:*

Be it known that we, NIEL GRAY and ELBRIDGE G. CUSHING, both of Oswego, in the county of Oswego and State of New York, have invented new and useful Improvements in Machines for Sizing, Stretching, and Drying Cloth, of which the following, taken in connection with the accompanying drawings, is a full, clear, and exact description.

The object of this invention is to provide a machine which shall size, stretch, and dry cloth with increased facility, accuracy, and rapidity, and produce an article free from wrinkles, stains, and other imperfections at a reduced expense of manufacture.

The invention is fully pointed out in the claims, and is illustrated in the accompanying drawings, wherein—

Figure 1:
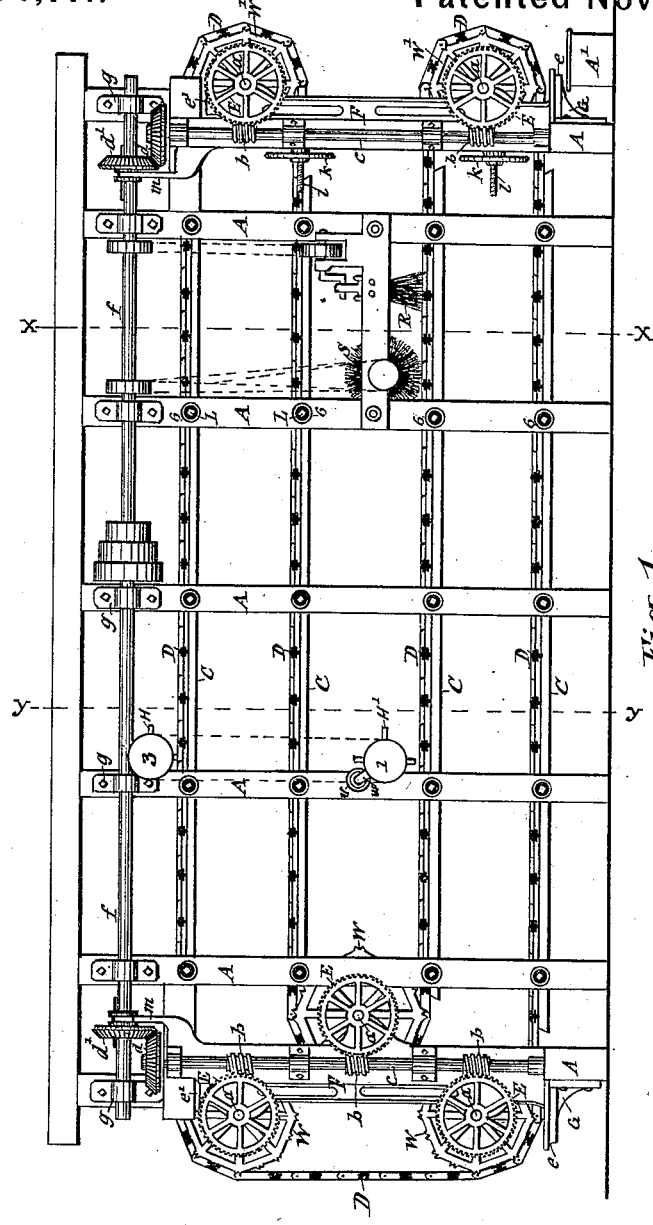
Figure 8:
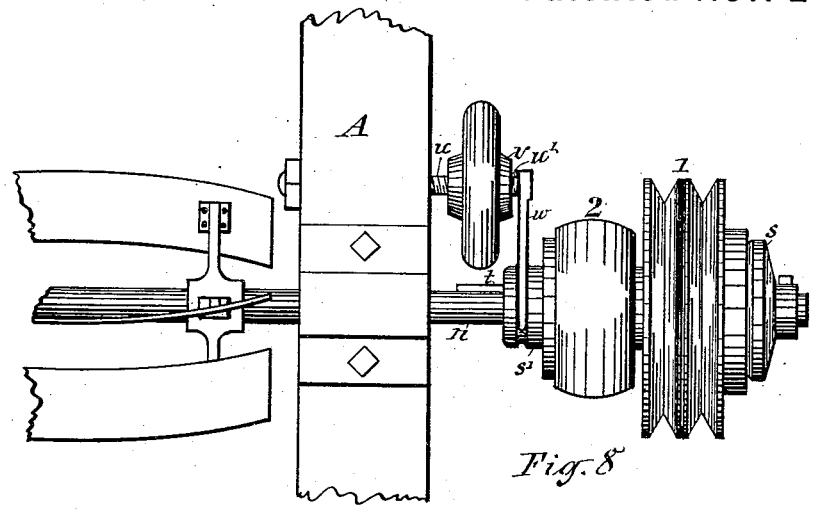
Figure 9:
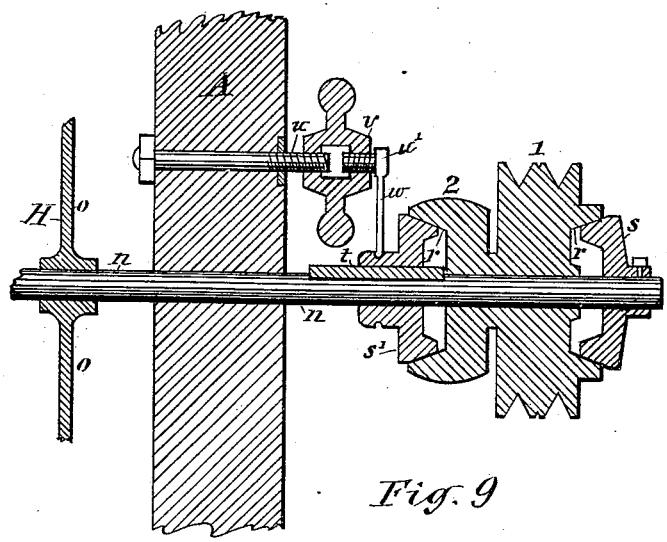
Figure 10:
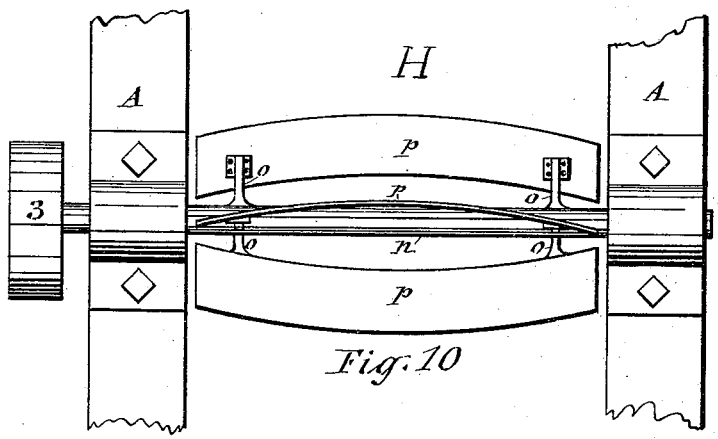
Figures 11, 12:
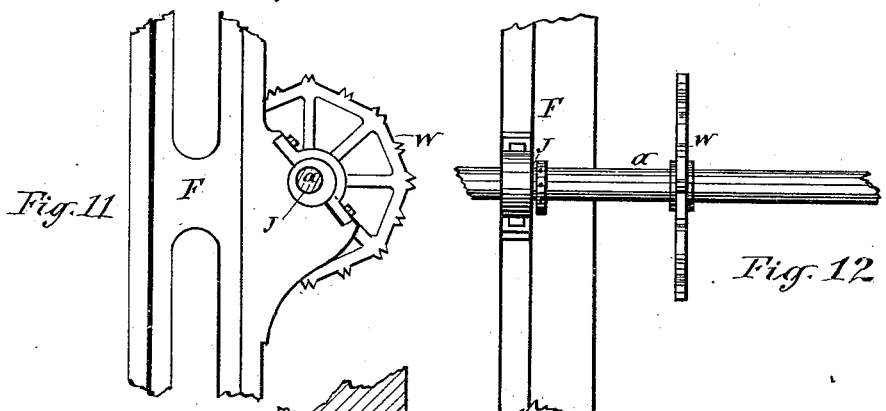
Figure 13:
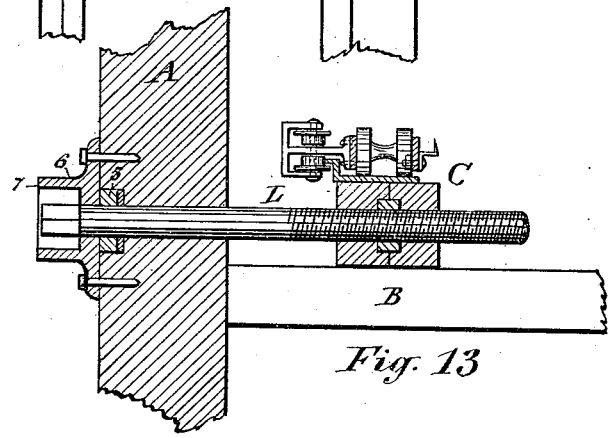

Figure 1 is a side elevation of a machine provided with our improvements; Fig. 2, an enlarged end view of same. Figs. 3 and 4 are enlarged transverse sections on lines $x\ x$ and $y\ y$, respectively, in Fig. 1. Figs. 5, 6, and 7 are enlarged detail views of the devices for adjusting the iron end frames of the machine in their position so as to take up the slack of the tentering-chains. Figs. 8 and 9 are an enlarged side view and a longitudinal section, respectively, of the clutch by which motion is transmitted to the lower drying-fan. Fig. 10 is a face view of the drying-fan detached. Figs. 11 and 12 are detail views of the eccentric journal-box or bush of the chain-wheel shaft, and Fig. 13 a detail view of the means for adjusting the track-stringers in their position.

Similar letters of reference indicate corresponding parts.

The frame of our machine is constructed in the ordinary manner, and consists of two series of posts, A A, arranged in perfectly-parallel straight lines and respectively opposite one another, each post being connected with its respective opposite post by a series of cross-bars, B B, arranged in different planes, and upon which are mounted longitudinal stringers C C, provided with the usual track and guide rails for the traveling endless tentering-chains D, which carry the cloth undergoing the stretching and drying process. Said chains pass around return carrying-wheels W W' in different planes at opposite ends of the machine, and are thereby conducted successively over the several tracks aforesaid. The wheels W W' are fixed to transverse shafts $a$, which are journaled in bearings on stout iron frames F at opposite sides of the respective ends of the wooden frame. At the outer side of the iron frame F each of the shafts $a$ is provided with a spur-wheel, E, and near the periphery of said wheel is a vertical shaft, $c$, journaled in suitable boxes secured to the outer side of the iron frame F, and having screw-threads or worms $b$, which engage the spur-wheels E aforesaid. Near the top, and extended the length of the machine, is a line-shaft, $f$, supported in suitable hangers $g$ on the posts A A, and provided at its two extremities with gear-wheel $d'$, which mesh in the miter-gear $d$ on the upper ends of the worm-shaft $c$, before described.

The line-shaft $f$, being connected with the prime motor, communicates motion to the worm-shafts $c$ at opposite ends of the machine by means of the gears $d\ d'$, and the worm-shafts transmit the motion to the chain-wheels W W' through the medium of the worms and the spur-wheels on the ends of the chain-wheel shafts.

By the described actuating mechanism all the chain-wheels are operated independently of each other, and yet synchronously and in perfect unison, thereby relieving the endless chains of undue strain and avoiding jars or vibrations, which heretofore have been the source of many defects in the finish of the cloth under treatment.

To compensate for the wear of the journals of the chain-wheel shafts, and thus maintain the gearing of same in proper connection with the worm-shaft, an eccentric bush or box, $j$, is provided for the bearing of the chain-wheel journal, as shown in Fig. 11 of the drawings, the said box having on its end a collar adapted for the application of a wrench for turning it so as to change the axial position of the aforesaid journal. Provision is made for taking up the slack of the chains incident to the wear of the connection of its links by mounting each of the iron frames F on a bracket, G, which is attached to the foot of the end post, A, and is provided on its top with a guideway, $e$, in which the foot of the iron frame slides, a similar guideway, $e'$, being arranged at the top of the machine for guiding the upper end of the frame F.

Through the wooden post A passes a sleeve, $h$, having a collar or shoulder, $i$, bearing on the side of the post A facing the frame F, and provided at the opposite side of said post with a hand-wheel, $k$, or other suitable means for turning said sleeve. The interior of the sleeve is screw-threaded, and in this works a screw-rod, $l$, which is firmly connected to the iron frame F, all as plainly shown in Fig. 6 of the drawings.

By turning the sleeve $h$ the screw $l$ is forced to move the iron frame F nearer to or farther from the wooden end post, A, and thus the proper tension of the endless chains can be obtained. When the said chains have become distended too far to admit of further movement of the iron frame F one of the links can be taken out of the chains and the iron frame moved up the requisite distance to compensate for said reduction in the length of the chains.

In order to maintain the gears $d$ on the end of the worm-shaft in connection with the gear $d'$ on the line-shaft during the aforesaid adjustment of the frame F, the gear $d'$ is made to slide on a feather or spline on the line-shaft, and the frame F is provided with an upward-projecting bifurcated arm, $m$, which embraces a circumferential groove in the hub of the gear $d'$, and thus carries the same with it during the before-described movement of the frame F.

H H' represent fans employed for facilitating the drying of the cloth. They are formed of a shaft, $n$, arranged transversely across the machine and having radial arms or spokes $o$, to which are attached blades or wings $p$, extended the width of the machine and curved or deflected at the center of their length so as to present convex or flaring opposing surfaces to the air, which they act upon, thereby producing a current of air diverging from the center of the machine outward in opposite directions, and thus effectually preventing the approach of dust, which otherwise would, to a great extent, settle on the cloth and soil the same.

There are generally two of the described fans, arranged, respectively, over the uppermost track of the tentering-chains and between the second and third tracks. The upper fan, which acts upon the cloth in its final return-passage through the machine, is kept in constant motion during the operation of the machine. The lower fan is only employed during certain periods when the atmosphere is damp or the upper fan found insufficient for the drying process. To regulate the action of the lower fan we mount on the shaft thereof a loose driving-pulley, 1, having rigidly attached to its side a pulley, 2, which by a belt is connected with the pulley 3 on the shaft of the upper fan, and thus keeps the same in motion.

The outer sides of the pulleys 1 and 2 are provided with tapering or conical recesses $r$, and facing the recess of the pulley 1 is a collar, $s$, firmly secured to the shaft of the lower fan and having its periphery beveled corresponding to the taper of the recess $r$, and adapted to enter the same sufficiently to become wedged or thoroughly bound therein. Facing the recess of pulley 2 is a similar beveled collar, $s'$, which slides on a feather, $t$, on the fan-shaft.

To the post A is rigidly attached a screw-threaded stud, $u$, which is parallel with the fan-shaft. Upon the said stud is a right-and-left-threaded nut, $v$, engaging, respectively, the stud $u$ and a screw-threaded stud, $u'$, which latter has an arm, $w$, extended from its outer end and engaging a circumferential groove in the hub of the sliding collar $s'$. By turning the nut $v$ the arm $w$ is moved bodily parallel to the fan-shaft, and can thus be made to force the sliding collar $s'$ into the recess $r$ of the pulley 2 and simultaneously crowd the pulley 1, with its recess, into the fixed collar $s$. The two collars $s$ $s'$, being thus bound in the driving-pulley, partake of the motion of the same and transmit it to the shaft of the lower fan. A reverse turn of the nut $v$ releases the collars $s$ $s'$ from the driving-pulley and stops the motion of the lower fan. By the employment of the tapered clutch-collars in conjunction with the right-and-left-threaded nut in the manner described the motion can be transmitted to the fan-shaft as gradually as may be desired, and without danger of incurring jars or shocks, which are so objectionable in the operation of this class of machines.

A' denotes the usual sizing-trough at one end of the machine, the cloth passing through said trough and receiving therein the sizing or coloring before it is applied to the tentering-chains D. Near the end of the machine, where the cloth is applied to said chains, are arranged a reciprocating brush, R, and a rotary brush, S, for the purpose of spreading the sizing over the cloth as it is carried along by the tentering-chains. The reciprocating brush R slides on a horizontal guide across the machine, and is connected with a crank, which is provided with a pulley and receives motion from a pulley on the line-shaft $f$ by a belt, as shown in the drawings. The rotary brush S has on the end of its arbor a pulley, which also receives motion from a pulley on the aforesaid line-shaft by a belt. These brushes have heretofore been made perfectly straight, and in consequence of this have failed to produce the desired effect. The cloth, saturated with the sizing and supported only at its side edges by the tentering-chains D, sags more or less at the center, and therefore the central portion of the cloth fails to come in contact with the said straight brushes and causes an uneven distribution of the sizing. To obviate this defect we either curve or trim the reciprocating brush R, so as to depress its central portion corresponding to the sag of the cloth, and taper the rotary brush S from its center to its opposite extremities, so as to form a convex brushing-surface corresponding to the concavity of the sagged cloth, thereby causing the said brushes to operate uniformly upon the entire width of the cloth, and thus thoroughly and evenly spread the sizing.

This machine has, like others of its class, one of the track-stringers C made adjustable to accommodate the distance between the tentering-chains to the width of cloth to be treated. For the said adjustment we employ a screw-rod, L, passed through the post A and working in a nut connected to the stringer. The outer end of said rod is provided with a square or hexagonal head for the application of a wrench, and back of said head it has a collar or shoulder, 5, which is countersunk in the outer face of the post. Over the collar 5 is a cap, 6, attached to the post and bearing on said collar, which latter being thus inclosed prevents longitudinal movement of the rod L. The cap 6 is provided with an outward-projecting ring, 7, which shields the head of the rod and serves as a guide in the application of the wrench.

Having thus described our improvements, what we claim as new, and desire to secure by Letters Patent, is—

1. The combination, with the endless tentering-chains D, their return carrying-wheels W W', and shafts $a$, situated in different vertical planes at opposite ends of the machine, of the iron frames F, provided with bearings for said shafts and with arms $m$, the gears E on shafts $a$, the shaft $c$, journaled on said frame F and provided with worms $b$, gears $d$ and $d'$, shaft $f$, and the main frame, substantially as described and shown.

2. The combination, with the endless tentering-chains D, their return carrying-wheels W W', gears E, and shafts $a$, situated in different vertical planes at opposite ends of the machine, of the line-shaft $f$, provided with feathers, the gears $d'$, mounted thereon, gears $d$, worm-shafts $c$, iron frames F, provided with the arms $m$, and bearings for said shafts $a$, and the main frame provided with brackets G, substantially as shown and set forth.

3. The combination, with the shafts $a$, provided with gears E, line-shaft $f$, provided with gear $d'$, and the worm-shaft $c$, provided with gear $d$, of the iron frame F, provided with the eccentric journal boxes or bushes $j$ for the bearings of shafts $a$, substantially in the manner and for the purpose set forth.

4. In combination with the endless tentering-chains D, chain-wheels W, and their shafts $a$, the frame F, main frame A, provided with guideways $e$ $e'$, the screw $l$, and the female threaded sleeve $h$, provided with collar $i$ and hand-wheel $k$, substantially as described and shown.

5. The combination, with the frame A and the stretching and drying mechanism of the machine, of the fans H H', having plates $p$ extended across the machine and deflected or convexed at the center, substantially in the manner and for the purpose specified.

6. The combination, with the tentering-chains D, of the reciprocating brush R, curved or deflected longitudinally, and means for actuating said brush and chains, substantially as and for the purposes set forth.

7. The combination, with the sizing and drying mechanism, of the rotary brush S, tapered from its center to its extremities, and means for actuating said brush, substantially as and for the purpose described.

In testimony whereof we have hereunto signed our names and affixed our seals, in the presence of two attesting witnesses, at Oswego, in the county of Oswego and State of New York, this 24th day of January, 1880.

NIEL GRAY. [L. S.]
ELBRIDGE G. CUSHING. [L. S.]

Witnesses:
C. BENDIXEN,
E. LAASS.